US010165267B2

(12) United States Patent
Lee et al.

(10) Patent No.: US 10,165,267 B2
(45) Date of Patent: Dec. 25, 2018

(54) MULTIVIEW VIDEO CODING SCHEMES

(75) Inventors: Sang-Hee Lee, Santa Clara, CA (US);
Xinglei Zhu, Santa Clara, CA (US);
Hong Jiang, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 699 days.

(21) Appl. No.: 13/977,398

(22) PCT Filed: Dec. 13, 2011

(86) PCT No.: PCT/US2011/064615
§ 371 (c)(1),
(2), (4) Date: Oct. 14, 2013

(87) PCT Pub. No.: WO2013/032512
PCT Pub. Date: Mar. 7, 2013

(65) Prior Publication Data
US 2014/0037007 A1   Feb. 6, 2014

Related U.S. Application Data

(60) Provisional application No. 61/528,844, filed on Aug. 30, 2011.

(51) Int. Cl.
*H04N 7/12* (2006.01)
*H04N 11/02* (2006.01)
(Continued)

(52) U.S. Cl.
CPC ....... *H04N 19/00769* (2013.01); *H04N 19/51* (2014.11); *H04N 19/597* (2014.11); *H04N 19/70* (2014.11)

(58) Field of Classification Search
CPC ....... H04N 19/00769; H04N 19/00587; H04N 7/32; H04N 7/36
(Continued)

(56) References Cited

U.S. PATENT DOCUMENTS 8,594,203 B2 * 11/2013 Ugur ................... H04N 19/597
348/394.1
2006/0133493 A1   6/2006 Cho
(Continued)

FOREIGN PATENT DOCUMENTS

EP   2352302 A1   8/2011
JP   2006-512809 A   4/2006
(Continued)

OTHER PUBLICATIONS

Pan R., Z-X. Zheng, and Y. Liu, Fast Algorithms for Inter-view Prediction of Multiview Video Coding, Journal of Multimedia, vol. 6, No. 2, Apr. 2011.*
(Continued)

*Primary Examiner* — Mohammed S Rahaman
*Assistant Examiner* — Richard A Hansell, Jr.
(74) *Attorney, Agent, or Firm* — Jordan IP Law, LLC

(57) ABSTRACT

Systems, devices and methods are described including determining an inter-view coding mode for at least a portion of an image frame, specifying a corresponding value of an inter-view coding mode indicator, and providing the mode indicator in a bitstream that includes an encoded motion vector associated with the image frame portion. A first value of the mode indicator corresponds to a first inter-view coding mode where the encoded motion vector includes components in multiple dimensions. A second value of the mode indicator corresponds to a second inter-view coding mode where the encoded motion vector components include components in only one dimension.

24 Claims, 6 Drawing Sheets

(51) Int. Cl.
  *H04N 11/04* (2006.01)
  *H04N 19/597* (2014.01)
  *H04N 19/51* (2014.01)
  *H04N 19/70* (2014.01)
(58) Field of Classification Search
  USPC .................................................. 375/240.16
  See application file for complete search history.

(56) References Cited

U.S. PATENT DOCUMENTS

| | | | | |
|---|---|---|---|---|
| 2006/0153298 | A1* | 7/2006 | Valente | H04N 19/52 375/240.16 |
| 2007/0109409 | A1* | 5/2007 | Yea | H04N 7/181 348/153 |
| 2008/0089412 | A1* | 4/2008 | Ugur | H04N 19/597 375/240.12 |
| 2008/0253671 | A1 | 10/2008 | Choi et al. | |
| 2010/0118933 | A1* | 5/2010 | Pandit | H04N 19/597 375/240.01 |
| 2011/0038418 | A1* | 2/2011 | Pandit | G06T 9/001 375/240.16 |
| 2011/0044550 | A1* | 2/2011 | Tian | H04N 19/597 382/238 |
| 2011/0141234 | A1* | 6/2011 | Tsukagoshi | H04N 7/52 348/43 |
| 2012/0236934 | A1* | 9/2012 | Chen | H04N 19/597 375/240.03 |
| 2012/0269270 | A1* | 10/2012 | Chen | H04N 19/597 375/240.16 |
| 2013/0003849 | A1* | 1/2013 | Chien | H04N 19/13 375/240.16 |
| 2013/0022111 | A1* | 1/2013 | Chen | H04N 19/597 375/240.12 |
| 2013/0176390 | A1* | 7/2013 | Chen | H04N 19/597 348/43 |
| 2013/0202035 | A1* | 8/2013 | Chen | H04N 19/00781 375/240.12 |
| 2013/0242046 | A1* | 9/2013 | Zhang | H04N 13/0048 348/43 |

FOREIGN PATENT DOCUMENTS

| | | |
|---|---|---|
| JP | 2009-522986 A | 6/2009 |
| KR | 0751422 B1 | 8/2007 |
| KR | 2008-0092359 A | 10/2008 |
| KR | 20080092359 | 10/2008 |
| KR | 20100105877 A | 9/2010 |
| KR | 20110009649 A | 1/2011 |
| KR | 20060133493 A | 12/2016 |
| TW | 200814796 | 3/2008 |
| WO | 2008/126986 A1 | 10/2008 |
| WO | 2008117963 A1 | 10/2008 |
| WO | 2009/005658 A2 | 1/2009 |
| WO | 2009005658 A2 | 1/2009 |
| WO | 2010043773 A1 | 4/2010 |
| WO | WO 2010043773 A1 * 4/2010 ......... H04N 13/0022 |  |
| WO | 2010/043773 A1 | 4/2012 |
| WO | 2013/032512 A1 | 3/2013 |

OTHER PUBLICATIONS

Notice of Preliminary Rejection for Korean Patent Application No. 2014-7004657, dated May 29, 2015, 4 pages.
European Search Report for EP1187146.6, dated Jul. 10, 2015, 7 pages.
Notice of Reasons for Rejection in JP Patent Application No. 2014-528375, dated Mar. 3, 2015, 4 pages.
Notice of Reasons for Rejection (English translation) in JP Patent Application No. 2014-528375, dated Mar. 3, 2015, 5 pages.
International Preliminary Report on Patentability and Written Opinion received for PCT Patent Application No. PCT/US2011/064615, dated Mar. 13, 2014, 6 pages.
International Search Report and Written opinion for PCT Patent Application No. PCT/US2011/064615, dated Sep. 26, 2012, 9 Pages.
Notice of Final Rejection for Korean Patent Application No. 2014-7004657, dated Dec. 24, 2015, 3 pages. (and English translation, 3 pages).
First Office Action for CN201180073149.7, dated Jun. 29, 2016, 9 pages.
Official Letter and Search Report for Taiwan Patent Application No. 101129356 dated Jun. 8, 2016, 8 pages.
Official Letter and Search Report for Taiwan Patent Application No. 101129356 dated Sep. 23, 2016, 7 pages.
Search Report for TW Patent Application No. 101129356 dated Sep. 22, 2016, 1 page of English translation.
English translation of Decision to Refuse for JP Patent Application No. 2014-528375 dated Jan. 5, 2016, 4 pages.

* cited by examiner

400

500

600

700

MULTIVIEW VIDEO CODING SCHEMES

RELATED APPLICATIONS

This application claims priority to and benefit of U.S. Provisional Patent Application No. 61/528,844, filed on Aug. 30, 2011.

BACKGROUND

Multiview Video Coding (MVC) is an extension of the H.264/AVC video coding standard. It allows several video sequences having difference views of a scene to be encoded in a single bitstream including a base view and additional non-base views the may be coding dependent on the base view. There are also possible coding dependency relationships between the non-base views. After encoding, each view may be represented as an individual bitstream, or the individual view bitstreams may be merged together.

Inter-view prediction is an important compression technique in MVC. The different video sequences, taken at difference camera positions relative to a scene, often exhibit strong correlations between the views. Thus, when encoding an image frame or picture in a particular view, the picture in a base view and/or in other additional views may be used as inter-view reference pictures to improve coding efficiency. Further, an encoder may decide between using inter-view reference pictures or using temporal reference pictures from within the video sequence of the same view. In motion estimation, a two-dimensional (2D) motion vector (MV) of form MV $(x_p, y_p)$ is first predicted and then other MVs are searched for within a particular range to identify a best MV (x, y) that minimizes the distortion between the current block and the reference block. The difference between MV (x, y) and MV $(x_p, y_p)$ is then encoded as a residual signal.

In multiple view sequence, the projection of the same object on a difference views may be related to the corresponding camera positions. For example, parallel camera techniques are widely used because they simulate the human stereo vision system well. In parallel camera settings, the cameras may be aligned such that their positions differ substantially only in one dimension (e.g., along an x-axis). Thus, the positions of two projections of the same 3D space pixel onto two corresponding views may differ only in one dimension (e.g., in the x direction).

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriated, reference labels have been repeated among the figures to indicate corresponding or analogous elements. In the figures.

DETAILED DESCRIPTION

Figure 1:
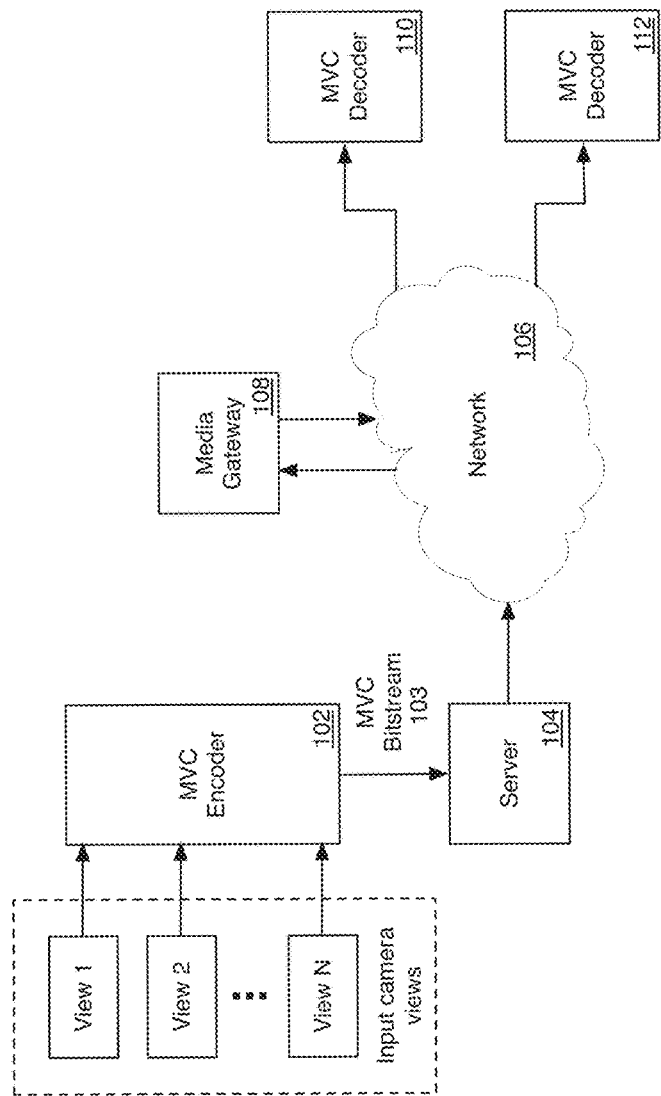
FIG. 1 is an illustrative diagram of an example multiview video coding system.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

FIG. 1 illustrates an example multiview video coding (MVC) system 100 in accordance with the present disclosure. In various implementations, MVC 100 may include an MVC encoder 102, a server 104, a network 106, a media gateway 108, and MVC decoders 110 and 112. In various implementations, MVC encoder 102 may receive input video image frames or pictures corresponding to multiple input camera views of a three-dimensional (3D) scene and may be configured to undertake video compression and/or implement video codecs according to one or more advanced video codec standards, such as, for example, the H.264/AVC standard (see ISO/IEC JTC1 and ITU-T, H.264/AVC—Advanced video coding for generic audiovisual services," ITU-T Rec. H.264 and ISO/IEC 14496-10 (MPEG-4 part 10), version 3, 2005) and extensions thereof including the Multiview Video Coding (MVC) extension to the AVC standard (see ISO/IEC 14496-10:2008 Amendment 1 (2008)) (hereinafter: the "MVC standard"). Although system 100 and/or other systems, schemes of processes may be described herein in the context of the MVC standard for the purposes of illustration and explanation, the present disclosure is not limited to any particular video encoding standard or specification.

In various implementations, MVC encoder 102 may implement a block-based hybrid video coding approach in which video frames are subdivided into slices that are in turn subdivided into macroblocks (MBs) for encoding. Each MB may correspond to a rectangular image area of 16×16 luma samples and, in the case of video in 4:2:0 chroma sampling format, two 8×8 chroma component sample areas. The MB samples may be either spatially or temporally predicted, and the resulting prediction residual signal may be represented using transform coding. In various implementations, MVC encoder 102 may determine what type of encoding to perform on as per-MB basis. As used herein, the term "block" may refer to a MB or to a sub-MB partition of video data.

As will be explained in greater detail below, MVC encoder 102 may use techniques in accordance with the present disclosure to generate encoded multiview video data representing different views of a scene. MVC encoder 102 may provide the encoded multiview video data in the form of a coded MVC bitstream 103 including as base view and additional non-base views whose coding may be dependent on the base view. In various implementations, each view may be represented by a separate MVC bitstream, or the view bitstreams may be merited together to form a single bitstream such as MVC bitstream 103.

Server 104 may transmit bitstream 103 over network 106 to different clients, such as MVC decoders 110 and 112, having different video decoding capabilities. In various implementations, bitstream 103 may be transmitted through one or more media gateways such as media gateway 108. In various implementations, media gateway 108 may be a media-aware network element that may manipulate incoming video packets or sub-bitstreams of bitstream 103 before providing an altered form of bitstream 103 to MVC decoders 110 and 112. In some implementations, media gateway 108 may manipulate bitstream 103 to provide only a base view bitstream to systems and/or devices (not shown in FIG. 1) that are not configured to undertake MVC techniques. For systems and/or devices that are capable of MVC techniques, such as MVC decoders 110 and 112, the base view bitstream and one or more non-base view bitstream components of bitstream 103 may be used to undertake MVC techniques to be described herein.

At MVC decoders 110 and 112, the coded video data may be extracted from bitstream 103 and then decoded and rendered in different ways depending on the application scenarios and capabilities of the systems and/or devices incorporating MVC decoders 110 and 112. For instance, MVC decoder 110 may be part of a stereoscopic display system (not depicted in FIG. 1), while MVC decoder 112 may be part of a free-viewpoint video system (also not depicted in FIG. 1), to name a few nonlimiting examples. In various implementations, MVC decoders 110 and 112 may undertake various MVC techniques, such as inter-view motion compensation, using information and/or data provided by bitstream 103. For example, MBs in a non-base view picture slice may be predicted based on an encoded MV provided in MVC bitstream 103 that points to or references a MB in a base view picture.

In various embodiments, a video and/or media processor may implement MVC encoder 102 or MVC decoders 110 and/or 112 of system 100. In general, various components of system 100 may be implemented in software, firmware, and/or hardware and/or any combination thereof. For example, various components of system 100 may be provided, at least in part, by hardware of a computing system-on-a-chip (SoC) such as may be found in a consumer electronics (CE) device or system.

Further, while FIG. 1 depicts a server 104 communicatively coupling MVC encoder 102 to network 106, similar server(s), not depicted in FIG. 1 in the interest of clarity, may likewise communicatively couple MVC decoders 110 and 112 to network 106. In addition, while FIG. 1 depicts MVC decoders 110 and 112 as receiving bitstream 103 from network 106, the present disclosure is not limited to any particular schemes, technologies and/or systems for communicating bitstream 103 to MVC decoders 110 and 112. Thus, in various implementations, MVC decoders 110 and 112 may receive bitstream 103 as data stored on a computer-readable storage medium such as a, for example, as High-Definition/Density Digital Video Disk (HD-DVD). Moreover, in various implementations, an MVC decoder in accordance with the present disclosure may be implemented in a CE device, such as a set-top box, cable-ready television or the like, and may receive an MVC bitstream in accordance with the present disclosure via a cable network, satellite network or the like.

In various implementations, the present disclosure is not limited by the specific nature of various components of system 100 such as server 104, network 106, anchor media gateway 108. For example, server 104 may include any web server or similar program running on any computing system such that it permits MVC encoder 102 to send bitstream 103 over network 106. Similarly, network 106 may be any type and/or combination of wired and/or wireless networks or network systems that are capable of communicating bitstream 103 between MVC encoder 102 and/or server 104 and MVC decoders 110 and 112.

Inter-View Prediction

As noted previously, when encoding a picture in a particular view, such as a non-base view, MVC encoder 102 may use pictures in a base and/or in other non-base views as inter-view reference pictures to improve coding efficiency. Further, when performing motion estimation for a particular frame portion (e.g., a MB), MVC encoder 102 may decide between using inter-view prediction or temporal prediction techniques. When performing inter-view prediction techniques, MVC encoder 102 may use inter-view pictures as reference pictures for motion estimation purposes.

In accordance with the present disclosure and as will be explained in greater detail below, MVC encoder 102 may determine an inter-view coding mode employed when performing inter-view prediction and may provide a corresponding mode indicator, bit or flag in bitstream 103 indicating the inter-view coding mode associated with at least an image portion or a multi view video sequence. In various implementations, MVC encoder 102 may place the mode indicator in different locations within bitstream 103 including within picture and/or slice header syntax and/or MB syntax components of bitstream 103.

In accordance with the present disclosure, an inter-view coding mode determined by MVC encoder 102 may be specified as having one of two states: a first inter-view coding mode where two-dimensional (2D) inter-view MVs are encoded so that, for each MV, both MV components are encoded an appear in the bitstream, and a second inter-view coding mode where one-dimensional (1D) inter-view MVs are encoded so that, for each MV, only one MV component is encoded and appears in the bitstream. As used herein, an inter-view MV points from a MB (or macroblock and/or sub-macroblock partition) in one view's video sequence to a MB for macroblock and/or sub-macroblock partition) in another view's video sequence. For instance, in the first inter-view coding mode, an encoded inter-view MV may include two MV components (e.g., x and y) that specify displacement in two dimensions, while, in the second inter-view coding mode, an encoded inter-view MV may include only one MV component (e.g., x or y) that specifics displacement in only one dimension thereby reducing the number of bits appearing in the corresponding bitstream.

Figure 2:
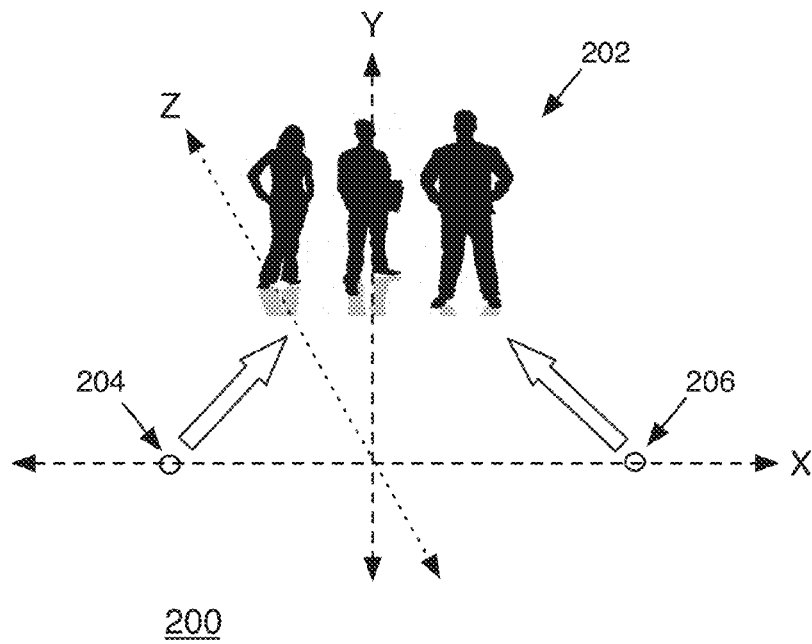
FIG. 2 illustrates an example multiview scenario.

For example, FIG. 2 illustrates an example multiview scenario 200 in which video sequences of a 3D scene 202 are captured from two different viewpoints 204 and 206 that are displaced from each other along one direction, arbitrarily labeled as the "x" axis in this example. In scenario 200, imaging devices such as cameras (not shown) capturing video from viewpoints 204 and 206 may be in a parallel camera setting where the cameras are aligned along a direction such that their positions differ substantially only in one dimension (e.g., the x-axis) and are substantially the same in the other two dimensions. As a result, the positions of the two protections of a 3D space pixel of scene 202 onto the two views 204 and 206 may differ substantially in only that one dimension. Therefore, an inter-view MV, pointing from a MB in one view to as MB in the other view, may have only one substantive component (e.g., the x component) while the other component (e.g., the y component) has zero or substantially zero value. Thus, when forming a bitstream in scenarios having zero or substantially zero MV component values, such as scenario 200, MVC encoder 102 may choose to not encode the zero or substantially zero MV components and, hence, the only MV component to be encoded and placed into the bitstream may be non-zero MV components.

MVC Bitstream

In various implementations, an inter-view video coding scheme in accordance with the present disclosure may directly indicate in a video bitstream whether a y component of a MV is encoded and appears in the bitstream. For example, a bitstream may include an inter-view mode indicator, flag or bit (b) to designate that, in a first inter-view coding mode (e.g., with a value b=0), both x and y MV components are encoded and appear in the bitstream, or that, in a second inter-view coding mode (e.g., with a value b=1), only x MV components are encoded and appear in the bitstream and that no y MV components are encoded and therefore do not appear in the bitstream. Correspondingly, the bitstream syntax would include encoded x and encoded y MV components (e.g., $(MV_x, MV_y)$) when the mode bit has a value of zero, or may include only encoded x MV components (e.g., $(MV_x, 0)$) when the mode bit has a value of one. However, the present disclosure is not limited to particular inter-view mode indicator logical values and, thus, in other implementations, a mode bit value of zero may be used to indicate that only $MV_x$ components are encoded while a mode bit value b=1 may be used to indicate that both $MV_x$ and $MV_y$ components are encoded, and so forth.

In various implementations, the inter-view coding mode indicator may be applied at various coding levels, including but not limited to the MB level and/or higher levels such as the slice level or picture level. When applied to a coding level that includes multiple MVs, the inter-view coding mode bit may be a leading bit in the header of the coding level, while the encoded MV components may be included in the MB syntax.

In various embodiments, MVC encoder 102 may implement a Network Abstraction Layer (NAL) that generates bitstream 103 by formatting encoded video data for inclusion in bitstream 103 and by providing header information in bitstream 103 that permits implementation of multi-view coding schemes by MVC decoders 110 and 112. In accordance with the present disclosure, MVC encoder 102 may generate bitstream 103 as sequences of NAL units or packets, where each NAL unit includes a multi-byte video data payload including encoded motion vector components. A single coded image frame, or access unit, may correspond to a set of consecutive NAL units, and a coded video sequence, such as a base view or non-base view coded video sequence, may correspond to a set of consecutive access units.

Figure 3:
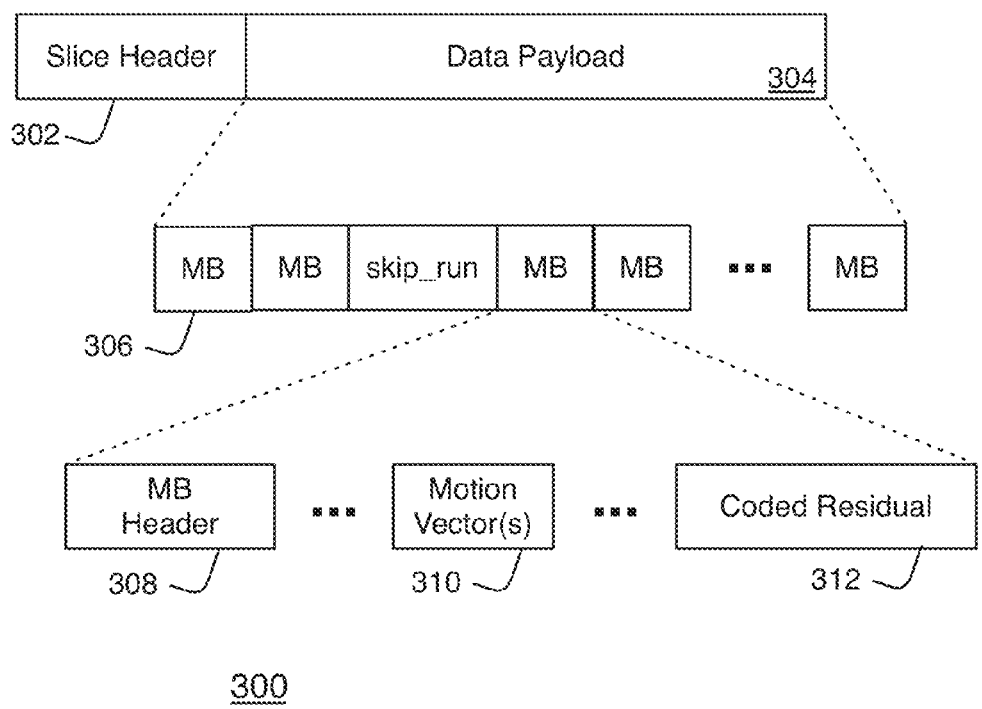
FIG. 3 illustrates an example bitstream portion.

In various implementations, NAL units in bitstream 103 may include slice and/or picture headers having sequence and picture parameter sets and/or supplemental enhancement information (SEI) messages. For example, in the MVC standard, an MVC-coded slice NAL unit, includes a 4-byte header followed by a NAL unit payload. Syntax elements in a picture or slice header may include priority identification, view identification, and so forth. For example, FIG. 3 illustrates an example bitstream portion 300 including a slice header 302 and a data payload 304 where payload 304 includes, for example, coded MB syntax elements 306. Each coded MB syntax element 306 may include an MB header 308, coded component values for one or more coded motion vectors 310, and coded residual data 312.

Figure 4:
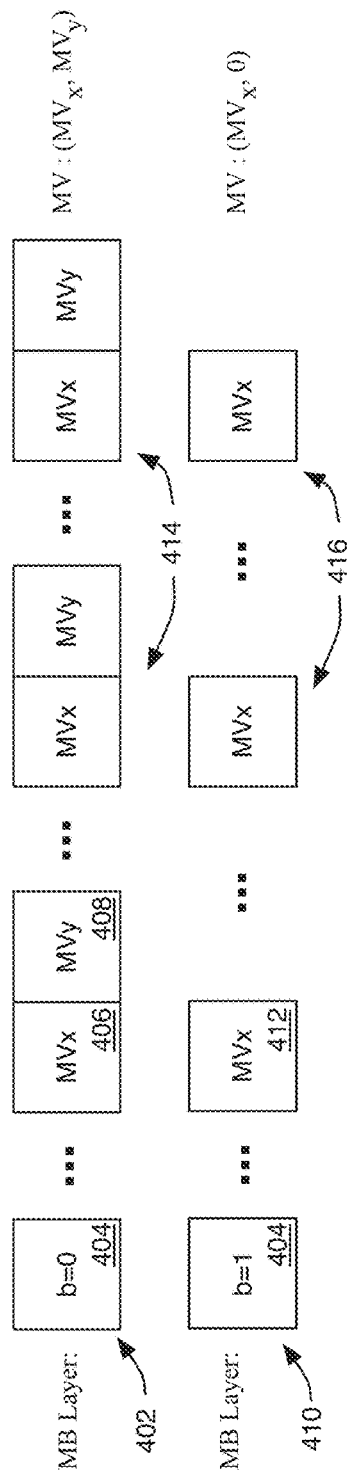
FIGS. 4 and 5 illustrate example syntax schemes.

In various implementations in accordance with the present disclosure, slice and/or picture headers in bitstream 103 may include inter-view coding mode indicators as described herein. In various implementations, bitstream 103 may include inter-view coding mode indicators at a macroblock layer or level. In such implementations, the inter-view coding mode indicator may be a leading bit provided in a macroblock header. For example, FIG. 4 illustrates an example MB level syntax scheme 400 in accordance with various implementations of the present disclosure. Scheme 400 includes MB syntax 402 where a value of zero for a lead bit 404 (e.g., corresponding to a first inter-view coding mode) indicates that both $MV_x$ 406 and $MV_y$ 408 components are encoded. Scheme 400 also includes MB syntax 410 where a value of one for lead bit 404 (e.g., corresponding to as second inter-view coding mode) indicates that only $MV_x$ components 412 are encoded. In some implementations, multiple pairs 414 of $MV_x$ and $MV_y$ components (e.g., more than two $MV_x$ and $MV_y$ component pairs) may follow lead bit 404 in syntax 402 and/or multiple $MV_x$ components 416 (e.g., more than one $MV_x$ component) may follow lead bit 404 in syntax 410.

Figure 5:
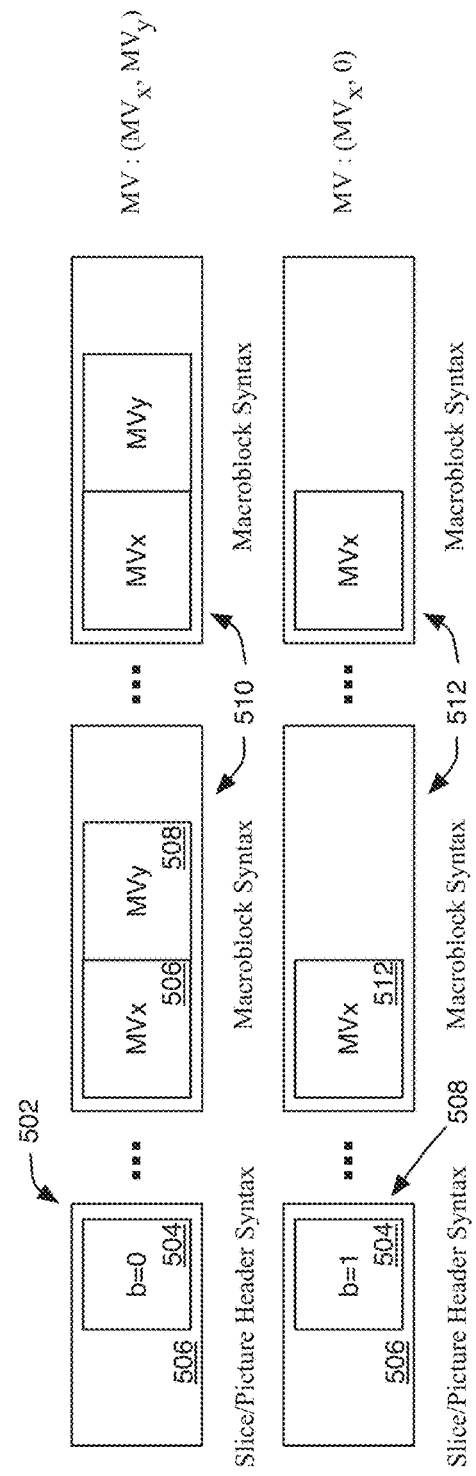

In various implementations, bitstream 103 may include inter-view coding mode indicators at a picture and/or slice layer or level. In such implementations, the inter-view coding mode indicator may be a leading bit provided in a picture and/or slice header. For example, FIG. 5 illustrates an example slice level syntax scheme 500 in accordance with various implementations of the present disclosure. Scheme 500 includes slice/picture syntax 502 where a value of zero for a bit 504 in a slice/picture header 506 (e.g., corresponding to a first inter-view coding mode) indicates that both $MV_x$ 506 and $MV_y$ 508 components are encoded. Scheme 500 also includes slice/picture syntax 508 where a value of one for bit 504 in header 506 (e.g., corresponding to a second inter-view coding mode) indicates that only $MV_x$ components 512 are encoded. In some implementations, multiple pairs 510 of $MV_x$ and $MV_y$ components may follow header 506 in syntax 502 and/or multiple $MV_x$ components 512 may follow header 506 in syntax 508.

Figure 6:
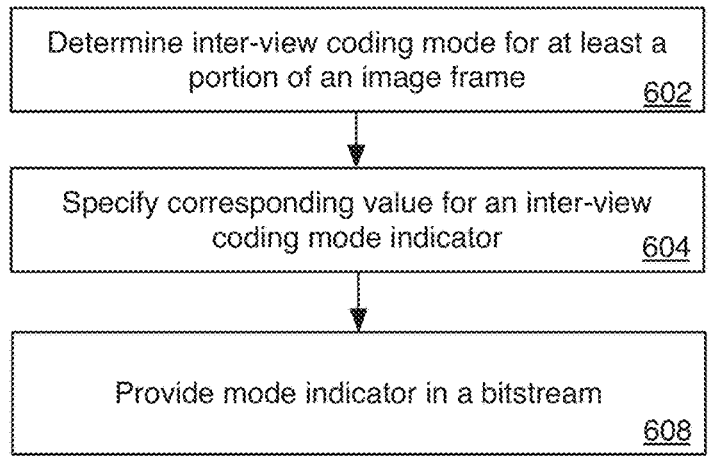
FIGS. 6 and 7 are flow charts of example processes for implementing inter-view coding schemes.

FIG. 6 illustrates at flow diagram of an example process 600 for implementing inter-view coding schemes at a video encoder according to various implementations of the present disclosure. In various implementations, process 600 may be used to indicate an inter-view coding mode using a coding mode indicator inserted into a bitstream produced, for example, by MVC encoder 102 of system 100. Process 600 may include one or more operations, functions or actions as illustrated by one or more of blocks 602, 604, and 606 of FIG. 6. By way of non-limiting example, process 600 will be described herein with reference to example inter-view coding syntax schemes 400 and 500 of FIGS. 4 and 5, respectively, as well as system 100 of FIG. 1.

Process 600 may begin at block 602 where an inter-view coding mode for at least a portion of an image frame may be determined. For example, block 602 may involve MVC decoder 102 determining an inter-view ending mode corresponding to syntax 402 of scheme 400 where encoded MV components for multiple dimensions (e.g., $MV_x$ and $MV_y$ components) are to be provided in bitstream 103 for a particular macroblock of a current image frame. Alternatively, an inter-view coding mode corresponding to syntax 410 of scheme 100 may be determined where encoded MV components for only one dimension (e.g., only $MV_x$ components) are to be provided in bitstream 103 for that particular macroblock.

In various implementations, block 602 may include selectively determining the inter-view coding mode. For example, MVC coding schemes in accordance with the present disclosure may be applied to both inter-view prediction and temporal prediction schemes. For example, implementation of inter-view coding modes may not be desired if the coding of a current frame depends on only a single reference picture in the same video sequence (and hence only temporal prediction is applied to that frame). In such circumstances, inter-view coding mode flags or indicators may be removed from or may not be placed in the bitstream syntax. On the other hand, if a current frame has multiple reference frames and both inter-view and temporal prediction may be applied, inter-view coding mode flags may be selectively added to the syntax based on a reference frame index. For example, inter-view coding mode flags may be added to a bitstream if the reference image frame index corresponds to an image frame of another view's video sequence. Thus, in various implementations, if a particular MB or subblock partition uses temporal prediction only, then inter-view coding mode indicators need not be inserted into the bitstream. On the other hand, if a particular MB or subblock partition may employ inter-view prediction coding, then one or more inter-view coding mode indicators may be inserted in the corresponding bitstream as described herein, and so forth.

At block 604, a corresponding value for an inter-view coding mode indicator may be specified. For example, referring to syntax scheme 400, leading bit 404 may be specified by MVC encoder 102 to have a value corresponding to the mode determined at block 602. Following the example of scheme 400, if the inter-view coding mode determined at block 602 specifies multi-dimensional inter-view motion vectors, then MVC encoder 102 may specify that leading bit 404 should have a value of zero at block 604. If, on the other hand, the inter-view coding mode determined at block 602 specifies only one-dimensional inter-view motion vectors, then MVC encoder 102 may specify that leading bit 404 should have a value of one at block 604. Similarly, referring to syntax scheme 500, leading bit 504 in slice header 506 may be specified by MVC encoder 102 at block 604 to have a value corresponding to the mode determined at block 602.

Process 600 may conclude at block 606 where the inter-view coding mode indicator may be provided in a bitstream. For example, block 606 may involve MVC encoder 102 of system 100 inserting bit 404 and/or bit 504 in bitstream 103 to indicate the inter-view coding mode determined at block 602. As noted above, the inter-view coding mode indicator may be provided in a picture and/or slice header syntax of a slice NAL unit and/or in the header syntax of a coded MB or subblock element.

Figure 7:
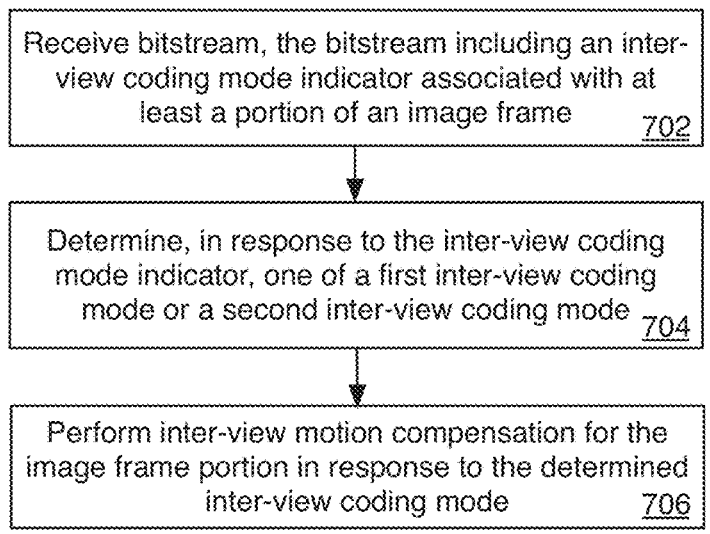

FIG. 7 illustrates a flow diagram of an example process 700 for implementing inter-view coding schemes at a video decoder according to various implementations of the present disclosure. In various implementations, process 700 may be used to undertake inter-view motion compensation at one or both of MVC decoders 110 and/or 112 of system 100 as indicated by a coding mode indicator received in a bitstream provided, for example, by MVC encoder 102 of system 100. Process 700 may include one or more operations, functions or actions as illustrated by one or more of blocks 702, 704, and 706 of FIG. 7. By way of non-limiting example, process 700 will be described herein with reference to example inter-view coding syntax schemes 400 and 500 of FIGS. 4 and 5, respectively, as well as system 100 of FIG. 1.

Process 700 may begin at block 702 where a bitstream may be received, where the bitstream includes an inter-view coding mode indicator associated with at least a portion of an image frame. For example, block 702 may involve MVC decoder 110 receiving a bitstream that includes an inter-view coding mode indicator as described herein. For instance, the bitstream received at block 702 may correspond to a bitstream as provided at block 608 of process 600 as described above.

At block 704, an inter-view coding mode may be determined in response to the inter-view coding mode indicator received at block 702. For example, depending on the value of the inter-view coding mode indicator, MVC decoder 110 may determine an inter-view coding mode at block 704. For example, if MVC decoder 110 receives an inter-view coding mode indicator similar to that provided by syntax 402 of scheme 400, then MVC decoder 110 may determine an inter-view coding mode where an encoded multi-dimensional MV (e.g., including encoded $MV_x$ and $MV_y$ components) is to be used to perform inter-view motion compensation for a particular macroblock of a current image frame. Alternatively, if MVC decoder 110 receives an inter-view coding mode indicator similar to that provided by syntax 410 of scheme 400, then MVC decoder 110 may determine an inter-view coding mode where an encoded one-dimensional MV (e.g., including only one encoded $MV_x$ component) is to be used to perform inter-view motion compensation for that particular macroblock.

Process 700 may conclude at block 706 where inter-view motion compensation may be performed for the image frame portion in response to the inter-view coding mode determined at block 704. For example, in various implementations, in one inter-view coding mode, block 706 may involve MVC decoder 110 performing multi-view motion compensation for the particular macroblock using a multi-dimensional MV (e.g., including $MV_x$ and $MV_y$ components). Alternatively, in the other inter-view coding mode, block 706 may involve MVC decoder 110 performing multi-view motion compensation for the particular macroblock using a one-dimensional MV (e.g., including only a $MV_x$ component).

While implementation of example processes 600 and 700, as illustrated in FIGS. 6 and 7, may include the undertaking of all blocks shown in the order illustrated, the present disclosure is not limited in this regard and, in various examples, implementation of processes 600 and 700 may include the undertaking only is subset of the blocks shown and/or in is different order than illustrated.

In addition, any one or more of the blocks of FIGS. 6 and 7 may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the blocks shown in FIGS. 6 and 7 in response to instructions conveyed to the processor by a computer readable medium.

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 8:
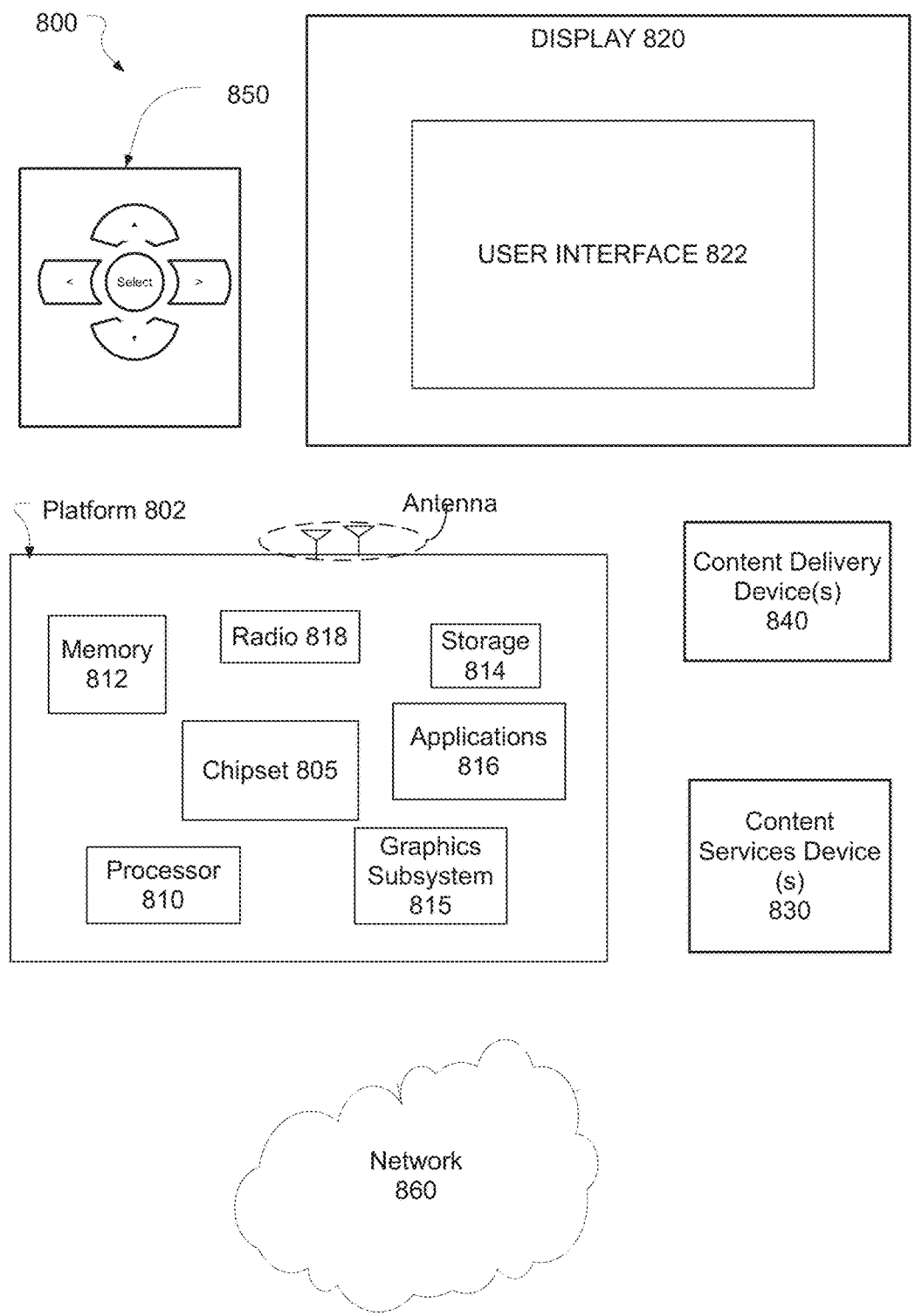
FIG. 8 is an illustrative diagram of an example system.

FIG. 8 illustrates an example system 800 in accordance with the present disclosure. In various implementations, system 800 may be a media system although system 800 is not limited to this context. For example, system 800 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 800 includes a platform 802 coupled to a display 820. Platform 802 may receive content from a content device such as content services device(s) 830 or content delivery device(s) 840 or other similar content sources. A navigation controller 850 including one or more navigation features may be used to interact with, for example, platform 802 and/or display 820. Each of these components is described in greater detail below.

In various implementations, platform 802 may include any combination of a chipset 805, processor 810, memory 812, storage 814, graphics subsystem 815, applications 816 and/or radio 818. Chipset 805 may provide intercommunication among processor 810, memory 812, storage 814, graphics subsystem 815, applications 816 and/or radio 818. For example, chipset 805 may include a storage adapter (not depicted) capable of providing intercommunication with storage 814.

Processor 810 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 810 may be dual-core processor(s), dual-core mobile processor(s), and so forth.

Memory 812 may be implemented as a volatile memory device such as, but not limited to, a Random Access Memory (RAM), Dynamic Random Access Memory (DRAM), or Static RAM (SRAM).

Storage 814 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 814 may include technology to increase the storage performance enhanced protection for valuable digital media when multiple hard drives are included, for example.

Graphics subsystem 815 may perform processing of images such as still or video for display. Graphics subsystem 815 may be a graphics processing unit (GPU) or a visual processing unit (VPU), for example. An analog or digital interface may be used to communicatively couple graphics subsystem 815 and display 820. For example, the interface may be any of a High-Definition Multimedia Interface, DisplayPort, wireless HDMI, and/or wireless HD compliant techniques. Graphics subsystem 815 may be integrated into processor 810 or chipset 805. In some implementations, graphics subsystem 815 may be a stand-alone card communicatively coupled to chipset 805.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In various implementations, display 820 may include any television type monitor or display. Display 820 may include, for example, a computer display screen, touch screen display, video monitor, television-like device, and/or a television. Display 820 may be digital and/or analog. In various implementations, display 820 may be a holographic display. Also, display 820 may be a transparent surface that may receive as visual projection. Such projections may convey various forms of information, images, and/or objects. For example, such projections may be a visual overlay for as mobile augmented reality (MAR) application. Under the control of one or more software applications 816, platform 802 may display user interface 822 on display 820.

In various implementations, content services device(s) 830 may be hosted by any national, international and/or independent service and thus accessible to platform 802 via the Internet, for example. Content services device(s) 830 may be coupled to platform 802 and/or to display 820. Platform 802 and/or content services device(s) 830 may be coupled to a network 860 to communicate (e.g., send and/or receive) media information to and from network 860. Content delivery device(s) 840 also may be coupled to platform 802 and/or to display 820.

In various implementations, content services device(s) 830 may include a cable television box, personal computer, network, telephone, Internet enabled devices or appliance capable of delivering digital information and/or content, and any other similar device capable of unidirectionally or bidirectionally communicating content between content providers and platform 802 and/display 820, via network 860 or directly. It will be appreciated that the content may be communicated unidirectionally and/or bidirectionally to and from any one of the components in system 800 and a content provider via network 860. Examples of content may include any media information including, for example, video, music, medical and gaming information, and so forth.

Content services device(s) 830 may receive content such as cable television programming including media information, digital information, and/or other content. Examples of content providers may include any cable or satellite television or radio or Internet content provider. The provided examples are not meant to limit implementations in accordance with the present disclosure in any way.

In various implementations, platform 802 may receive control signals from navigation controller 850 having one or more navigation features. The navigation features of controller 850 may be used to interact with user interface 822, for example. In embodiments, navigation controller 850 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 850 may be replicated on a display (e.g., display 820) by movements of a pointer, cursor, focus ring, or other visual indicators displayed on the display. For example, under the control of software applications 816, the navigation features located on navigation controller 850 may be mapped to virtual navigation features displayed on user interface 822, for example. In embodiments, controller 850 may not be a separate component but may be integrated into platform 802 and/or display 820. The present disclosure, however, is not limited to the elements or in the context shown or described herein.

In various implementations, drivers (not shown) may include technology to enable users to instantly turn on and off platform 802 like a television with the touch of a button after initial boot-up, when enabled, for example. Program logic may allow platform 802 to stream content to media adaptors or other content services device(s) 830 or content delivery device(s) 840 even when the platform is turned "off." In addition, chipset 805 may include hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 800 may be integrated. For example, platform 802 and content services device(s) 830 may be integrated, or platform 802 and content delivery device(s) 840 may be integrated, or platform 802, content services device(s) 830, and content delivery device(s) 840 may be integrated, for example. In various embodiments, platform 802 and display 820 may be an integrated unit. Display 820 and content service device(s) 830 may be integrated, or display 820 and content delivery device(s) 840 may be integrated, for example. These examples are not meant to limit the present disclosure.

In various embodiments, system 800 may be implemented as a wireless system, a wired system, or a combination of both. When implemented as a wireless system, system 800 may include components and interfaces suitable for communicating over as wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interlaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
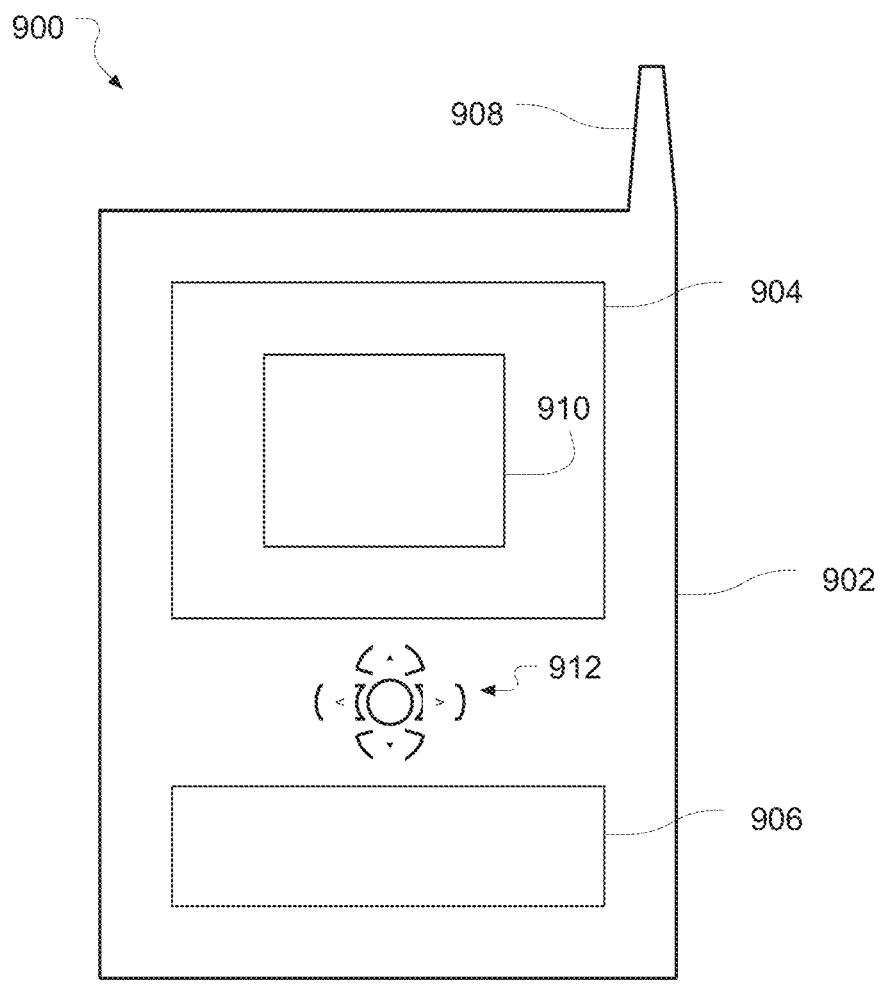
FIG. 9 is an illustrative diagram of an example device, all arranged in accordance with at least some implementations of the present disclosure.

As described above, system 800 may be embodied in varying physical styles or form factors. FIG. 9 illustrates implementations of a small form factor device 900 in which system 800 may be embodied. In embodiments, for example, device 900 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, device 900 may include a housing 902, a display 904, an input/output (I/O) device 906, and an antenna 908. Device 900 also may include navigation features 912. Display 904 may include any suitable display unit for displaying information appropriate for a mobile computing device. I/O device 906 may include any suitable I/O device for entering information into a mobile computing device. Examples for I/O device 906 may include an alphanumeric keyboard, a numeric keypad, a touch pad, input keys, buttons, switches, rocker switches, microphones, speakers, voice recognition device and software, and so forth. Information also may be entered into device 900 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description not intended to be construed in a limiting sense. Hence, various modifications of the implementations described herein, as well as other implementations, which are apparent to persons skilled in the art to which the present disclosure pertains are deemed to lie within the spirit and scope of the present disclosure.

What is claimed:

1. A computer implemented method, comprising:
   at a video encoder, wherein the video encoder comprises a multiview video coding (MVC) encoder,
   receiving input video image frames for encoding thereof;
   determining, as part of the process encoding an image frame during inter-view motion estimation motion vector prediction, an inter-view coding mode for at least a portion of the image frame for inter-view encoding of the image frame based on a further image frame as reference;
   specifying a corresponding value for an inter-view coding mode indicator for the image frame; and
   providing the mode indicator in a bitstream, wherein the bitstream includes an encoded motion vector associated with the image frame portion,
   wherein a first value of the mode indicator corresponds to a first inter-view coding mode for the image frame wherein the encoded motion vector includes components in multiple dimensions, and wherein a second value of the mode indicator corresponds to a second inter-view coding mode for the image frame wherein the encoded motion vector components include components in only one dimension.

2. The method of claim 1, wherein, in the second inter-view coding mode, zero or substantially zero motion vector components are not encoded.

3. The method of claim 1, wherein a picture header or slice header of the bitstream includes the inter-view coding mode indicator.

4. The method of claim 1, wherein the image frame portion comprises a macroblock, and wherein providing the mode indicator in the bitstream comprises placing the mode indicator in syntax associated with the macroblock.

5. The method of claim 1, wherein in the first inter-view coding mode the encoded motion vector includes more than one component, and wherein in the second inter-view coding mode the encoded motion vector includes only one component.

6. The method of claim 1, wherein determining the inter-view coding mode comprises selectively determining the inter-view coding mode in response to a reference image frame index.

7. The method of claim 6, wherein the image frame portion comprises an image frame portion of a first view's video sequence, and wherein selectively determining the inter-view coding mode comprises determining the inter-view coding mode only if the reference image frame index corresponds to an image frame of a second view's video sequence.

8. A computer implemented method, comprising:
at a video decoder, wherein the video decoder comprises a multiview video coding (MVC) decoder,
receiving a bitstream of encoded video image frames for decoding thereof, the bitstream including an inter-view coding mode indicator associated with at least a portion of an image frame, the image frame portion being inter-view encoded based on a further image frame as reference;
determining, in response to the inter-view coding mode indicator from inter-view motion estimation motion vector prediction, one of a first inter-view coding mode or a second inter-view coding mode; and
performing, as part of the process of decoding of the image frame, inter-view motion compensation for the image frame portion in response to the determined inter-view coding mode for the image frame, wherein in the first inter-view coding mode for the image frame the bitstream includes an encoded motion vector having components in multiple dimensions, and wherein in the second inter-view coding mode for the image frame the bitstream includes an encoded motion vector having components in only one dimension.

9. The method of claim 8, wherein, in the second inter-view coding mode, zero or substantially zero motion vector components are not encoded.

10. The method of claim 8, wherein a picture header or slice header of the bitstream includes the inter-view coding mode indicator.

11. The method of claim 8, wherein the image frame portion comprises a macroblock, and wherein the macroblock's bitstream syntax includes the inter-view coding mode indicator.

12. The method of claim 8, wherein in the first inter-view coding mode the encoded motion vector includes more than one component, and wherein in the second inter-view coding mode the encoded motion vector includes only one component.

13. A non-transitory article comprising a computer program product having stored therein instructions that, if executed, result in operations, comprising:
receiving a bitstream of encoded video image frames for decoding thereof, the bitstream including an inter-view coding mode indicator associated with at least a portion of an image frame, the image frame portion being inter-view encoded based on a further image frame as reference;
determining, in response to the inter-view coding mode indicator from inter-view motion estimation motion vector prediction, one of a first inter-view coding mode or a second inter-view coding mode; and
performing, as part of the process of decoding of the image frame, inter-view motion compensation for the image frame portion in response to the determined inter-view coding mode for the image frame, wherein in the first inter-view coding mode for the image frame the bitstream includes an encoded motion vector having components in multiple dimensions, and wherein in the second inter-view coding mode for the image frame the bitstream includes an encoded motion vector having components in only one dimension,
wherein the video decoding operations comprise multiview video coding-type (MVC) decoding operations.

14. The article of claim 13, wherein, in the second inter-view coding mode, zero or substantially zero motion vector components are not encoded.

15. The article of claim 13, wherein the image frame portion comprises a macroblock, and wherein providing the mode indicator in the bitstream comprises placing the mode indicator in syntax associated with the macroblock.

16. A system comprising:
an antenna to transmit a bitstream including video data; and
a video encoder, wherein the video encoder is communicatively coupled to the antenna and wherein the video encoder is to:
receive input video image frames for encoding thereof;
determine, as part of the process encoding an image frame during inter-view motion estimation motion vector prediction, an inter-view coding mode for at least a portion of the image frame for inter-view encoding of the image frame based on a further image frame as reference;
specify a corresponding value for an inter-view coding mode indicator for the image frame; and
provide the mode indicator in the bitstream, wherein the bitstream includes an encoded motion vector associated with the image frame portion,
wherein a first value of the mode indicator corresponds to a first inter-view coding mode for the image frame wherein the encoded motion vector includes components in multiple dimensions, and wherein a second value of the mode indicator corresponds to a second inter-view coding mode for the image frame wherein the encoded motion vector components include components in only one dimension,
wherein the video encoder comprises a multiview video coding (MVC) encoder.

17. The system of claim 16, wherein, in the second inter-view coding mode, zero or substantially zero motion vector components are not encoded.

18. The system of claim 16, wherein the image frame portion comprises a macroblock, and wherein to provide the mode indicator in the bitstream the video decoder is to place the mode indicator in syntax associated with the macroblock.

19. The system of claim 16, wherein in the first inter-view coding mode the encoded motion vector includes more than one component, and wherein in the second inter-view coding mode the encoded motion vector includes only one component.

20. A system comprising:
an antenna to receive a bitstream of encoded video image frames for decoding thereof, the bitstream including an inter-view coding mode indicator associated with at least a portion of an image frame, the image frame portion being inter-view encoded based on a further image frame as reference; and
a video decoder, wherein the video decoder is communicatively coupled to the antenna and wherein the video decoder is to:
determine, in response to the inter-view coding mode indicator from inter-view motion estimation motion vector prediction, one of a first inter-view coding mode or a second inter-view coding mode; and
perform, as part of the process of decoding of the image frame, inter-view motion compensation for the image frame portion in response to the determined inter-view coding mode for the image frame, wherein in the first inter-view coding mode for the image frame the bitstream includes an encoded motion vector having components in multiple dimensions, and wherein in the second inter-view coding mode for the image frame the bitstream includes an encoded motion vector having components in only one dimension, wherein the video decoder comprises a multiview video coding (MVC) decoder.

21. The system of claim 20, wherein, in the second inter-view coding mode, zero or substantially zero motion vector components are not encoded.

22. The system of claim 20, wherein a picture header or slice header of the bitstream includes the inter-view coding mode indicator.

23. The system of claim 20, wherein the image frame portion comprises a macroblock, and wherein the macroblock's bitstream syntax includes the inter-view coding mode indicator.

24. The system of claim 20, wherein in the first inter-view coding mode the encoded motion vector includes more than one component, and wherein in the second inter-view coding mode the encoded motion vector includes only one component.

* * * * *